(12) United States Patent
Reddy et al.

(10) Patent No.: US 12,530,915 B2
(45) Date of Patent: Jan. 20, 2026

(54) METHOD AND SYSTEM OF GENERATING BINARY IMAGE OF A DOCUMENT IMAGE BASED ON BACKGROUND COLOR

(71) Applicant: L&T TECHNOLOGY SERVICES LIMITED, Chennai (IN)

(72) Inventors: Yelampalli Niranjan Reddy, Nandyal (IN); Tarun Kumar Das, Digboi (IN); Pragyesh Kumar, Agra (IN); Triptesh Mallick, Bankura (IN); Madhusudan Singh, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 344 days.

(21) Appl. No.: 18/367,486

(22) Filed: Sep. 13, 2023

(65) Prior Publication Data
US 2024/0412546 A1    Dec. 12, 2024

(30) Foreign Application Priority Data
Jun. 9, 2023 (IN) .............................. 202341039697

(51) Int. Cl.
*G06T 7/194* (2017.01)
*G06T 7/13* (2017.01)
(Continued)

(52) U.S. Cl.
CPC .............. *G06V 30/412* (2022.01); *G06T 7/13* (2017.01); *G06T 7/194* (2017.01); *G06T 7/90* (2017.01);
(Continued)

(58) Field of Classification Search
CPC ...... G06V 30/412; G06V 10/25; G06V 10/46; G06V 10/60; G06T 7/13; G06T 7/194; G06T 7/90; G06T 2207/10024
(Continued)

(56) References Cited

U.S. PATENT DOCUMENTS 6,185,321 B1 * 2/2001 Fukushima ........ H04N 1/00843
                                                      382/135
6,360,006 B1 * 3/2002 Wang ................... G06V 30/162
                                                      382/164
(Continued)

FOREIGN PATENT DOCUMENTS

CN            111626027 A       9/2020

OTHER PUBLICATIONS

Borra Vineetha, D. N. D. Harini, Ravi Yelesvarupu , Automatic Table Detection, Structure Recognition and Data Extraction from Document Images, International Journal of Innovative Technology and Exploring Engineering (IJITEE), Issue-9, Jul. 2021, vol. 10, Blue Eyes Intelligence Engineering and Sciences Publication.

*Primary Examiner* — Ali Bayat
(74) *Attorney, Agent, or Firm* — Kendal M. Sheets

(57) ABSTRACT

A method and system for generating binary image of a document image is disclosed. The method includes determining a negative map image, an inverse negative map image, an HSV image and a grayscale image of the document image. One or more cells corresponding to at least one table are detected based on detection of lines in the negative map image. For each of the cells, a foreground mean value, a background mean value, and a background mean HSV value is determined. Each of the cells are categorized as a dark cell or a light cell based on the foreground mean value and the background mean value. Contrast value of each cell is determined based on the foreground mean value and the background mean value. The binary image is determined based on the contrast value, a pre-defined threshold value, the background mean HSV value and the categorization of the corresponding cell.

20 Claims, 7 Drawing Sheets

(51) Int. Cl.
*G06T 7/90* (2017.01)
*G06V 10/25* (2022.01)
*G06V 10/46* (2022.01)
*G06V 10/60* (2022.01)
*G06V 30/412* (2022.01)

(52) U.S. Cl.
CPC ............. *G06V 10/25* (2022.01); *G06V 10/46* (2022.01); *G06V 10/60* (2022.01); *G06T 2207/10024* (2013.01)

(58) Field of Classification Search
USPC .......................................................... 382/176
See application file for complete search history.

(56) References Cited

U.S. PATENT DOCUMENTS

| | | | |
|---|---|---|---|
| 2002/0090110 A1* | 7/2002 | Braudaway | G06T 1/005 382/100 |
| 2008/0249414 A1* | 10/2008 | Yang | A61B 8/0883 600/445 |
| 2012/0327450 A1* | 12/2012 | Sagan | G03G 21/046 358/1.14 |
| 2020/0193608 A1* | 6/2020 | Sato | G06V 20/46 |
| 2022/0188991 A1* | 6/2022 | Chopra | G06T 7/0002 |
| 2022/0257868 A1* | 8/2022 | Yan | A61M 5/16827 |

* cited by examiner

Negative Map Image

METHOD AND SYSTEM OF GENERATING BINARY IMAGE OF A DOCUMENT IMAGE BASED ON BACKGROUND COLOR

TECHNICAL FIELD

This disclosure relates generally to image processing and data extraction, and more particularly to a method and a system of generating a binary image.

BACKGROUND

Documents may include data in various formats which may include data containing table structure having cells with multi-colored text and various background colors. Further, due to similar intensity of the foreground and the background, text recognition and text extraction system becomes difficult and erroneous. Accordingly, the accuracy and efficiency of the extracted text data is reduced.

Some available techniques may allow determining cells in a table structure in a document image using deep learning models. However, these approaches are computationally intensive. And in case of a noisy image, such as an image with blurry text, it becomes difficult to determine the cells of a table structure in a document image.

Therefore, there is a requirement for a methodology which may enable generation of binary image of a document image having text data in tables which have various background and foreground color to enable text extraction accurately and efficiently.

SUMMARY OF THE INVENTION

In an embodiment, a method of generating a binary image from a document image comprising at least one table structure is disclosed. The method may include, determining by a processor, a negative map image, an inverse negative map image, an HSV image and a grayscale image of the document image. The method may further include, detecting by the processor, one or more cells corresponding to the at least one table based on detection of a plurality of lines in the negative map image. For each of the one or more cells, the processor may compute a foreground mean value, a background mean value, and a background mean HSV value of a corresponding cell based on pixel color values of the corresponding cell from the negative map image, the inverse negative map image, the HSV image and the grayscale image. The processor may further categorize each of the one or more cells as a dark cell or a light cell based on the foreground mean value and the background mean value. Further, the processor may compute a contrast value based on the foreground mean value and the background mean value. The method may further include determining by the processor, the binary image for the corresponding cell based on the contrast value, a pre-defined threshold value, the background mean HSV value and the categorization of the corresponding cell.

In another embodiment, a system of generating a binary image from a document image comprising at least one table structure is disclosed. The system may include a processor, a memory communicatively coupled to the processor, wherein the memory may store processor-executable instructions, which, when executed by the processor may cause the processor to determine a negative map image, an inverse negative map image, an HSV image and a grayscale image of the document image. The processor may further detect one or more cells corresponding to at least one table based on detection of a plurality of lines in the negative map image. For each of the one or more cells, the processor may compute a foreground mean value, a background mean value, and a background mean HSV value of a corresponding cell based on pixel color values of the corresponding cell from the negative map image, the inverse negative map image, the HSV image and the grayscale image. The processor may further categorize each of the one or more cells as a dark cell or a light cell based on the foreground mean value and the background mean value. The processor may further compute a contrast value based on the foreground mean value and the background mean value. The processor may further determine the binary image for the corresponding cell based on the contrast value, a pre-defined threshold value, the background mean HSV value and the categorization of the corresponding cell.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope and spirit being indicated by the following claims.

Since many complex documents include data containing table structure having cells with multi colored text and varying background shades, extraction of correct data from such documents becomes a complex task. The present disclosure provides a methodology for determining cells in a table structure in a document image based on color is disclosed.

Figure 1:
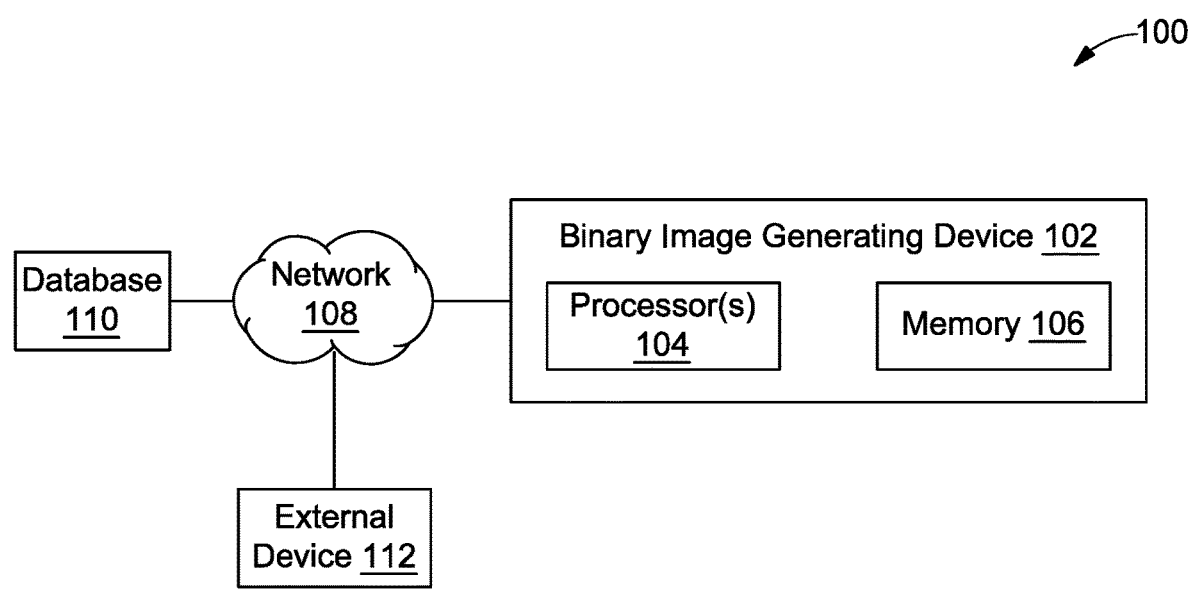
FIG. 1 illustrates a block diagram of a binary image generating system for generating a binary image from a document image, in accordance with some embodiments of the present disclosure.

Referring now to FIG. 1, a block diagram of a binary image generating system 100 for generating a binary image of a document image, in accordance with some embodiments of the present disclosure. The binary image generating system 100 may include a binary image generating device 102, an external device 112, and a database 110 communicably coupled to each other through a wired or a wireless communication network 108. The binary image generating device 102 may include a processor 104 and a memory 106. In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™, any system on a chip processors or other future processors. The memory 106 may store instructions that, when executed by the processor 104, cause the processor 104 to determine binary image of a document image based on a background color, as discussed in greater detail below. The memory 106 may be a non-volatile memory or a volatile memory. Examples of non-volatile memory may include but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

In an embodiment, the database 110 may be enabled in a cloud or a physical database comprising one or more document images which may include at least one table structure. In an embodiment, the database 110 may store data inputted by an external device 112 or generated by the binary image generating device 102.

In an embodiment, the communication network 108 may be a wired or a wireless network or a combination thereof. The network 108 can be implemented as one of the different types of networks, such as but not limited to, ethernet IP network, intranet, local area network (LAN), wide area network (WAN), the internet, Wi-Fi, LTE network, CDMA network, and the like. Further, network 108 can either be a dedicated network or a shared network. The shared network 108 may represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further network 108 can include a variety of network devices, including routers, bridges, servers, computing devices, storage devices, and the like.

In an embodiment, the binary image generating device 102 may receive a request for generating a binary image of a document image from the external device 112 through the network 108. In an embodiment, the external device 112 may be a variety of computing systems, including but not limited to, a smart phone, a laptop computer, a desktop computer, a notebook, a workstation, a portable computer, a personal digital assistant, a handheld, a scanner, or a mobile device. In an embodiment, the binary image generating device 102 may be, but not limited to, in-built into the external device 112.

By way of an example, the processor 104 of the binary image generating device 102 may determine a negative map image, an inverse negative image, an HSV image and a grayscale image of the document image that may be inputted by the external device 112 or read from the external database 110. In an embodiment, the document image of a pre-defined resolution such as, but not limited to, 2 megapixels may be utilized by the binary image generating device 102. Further, the processor 104 may detect, one or more cells corresponding to the at least one table based on detection of a plurality of lines in the negative map image. In an embodiment, the at least one table may be determined based on detection of a region of interest (ROI) in the negative map image based on detection of a plurality of lines. The plurality of lines may be determined based on morphological operations. In an embodiment, the horizontal lines and the vertical lines may be extracted from the negative map image based on a horizontal line mask and a vertical line mask. Further, each of the horizontal and the vertical lines may be extended at extreme points from the negative map image based on five neighborhood connectivity of pixels. Accordingly, the vertical lines mask and horizontal lines mask may be combined to determine the ROI. The ROI may correspond to a table which may include one or more cells that may be determined by contour extraction based on the extended boundary lines of the one or more cells.

The processor 104 may further compute a foreground mean value, a background mean value, and a background mean HSV value of each cell of the table based on pixel color values of the corresponding cell from the negative map image, the inverse negative map image, the HSV image, and the grayscale image. The foreground mean value may be determined based on determination of a mean of intensity value of a foreground masked grayscale image for each cell comprising non-zero pixels in the negative map image. In an embodiment, the foreground masked grayscale image may be generated by masking the grayscale image to remove background pixels equal to zero in the negative map image of the corresponding cell. Accordingly, the background mean value may be determined based on determination of a mean intensity value of a background masked grayscale image for the corresponding cell comprising non-zero pixels in the inverse negative map image. In an embodiment, the background masked grayscale image may be generated by masking the grayscale image to remove background pixels equal to zero in the inverse negative map image of each of the cell. The background mean HSV value for each of the one or more cells may be determined based on determination of a mean HSV value of the HSV image of each of the cell comprising non-zero pixels in the inverse negative map image of each of the cell.

The processor 104 may further categorize each of the one or more cells as a dark cell or a light cell based on the foreground mean value and the background mean value determined for each of the cells. The one or more cells may be categorized as a dark cell in case the foreground mean value of the corresponding cell is greater than the background mean value of the corresponding cell. The one or more cells may be categorized as a light cell in case the background mean value of the corresponding cell may be greater than the foreground mean value of the corresponding cell.

The processor 104 may further compute a contrast value of each cell based on the foreground mean value and the background mean value. The contrast value may be computed based on determination of a ratio of an absolute difference between the foreground mean value and the background mean value and a maximum of the foreground mean value and the background mean value for the corresponding cell.

Processor 104 may further determine the binary image for the corresponding cell based on the contrast value, a predefined threshold value, the background mean HSV value and the categorization of the corresponding cell. The binary image for a corresponding cell from the one or more cells may be determined by performing an inverse binary thresholding on the grayscale image in case the contrast value is determined to be greater than a predefined threshold value and in case the corresponding cell is categorized as a dark cell. In another embodiment, the binary image for the corresponding cell may be determined by performing a binary thresholding on the grayscale image in case the contrast value for the corresponding cell is determined to be greater than the predefined threshold value and in case the corresponding cell may be categorized as a light cell. In yet another embodiment, or the binary image for the corresponding cell may be determined by performing a binary thresholding on the HSV image based on a lower HSV threshold and an upper threshold in case the contrast value is determined to be less than the predefined threshold value.

Figure 2:
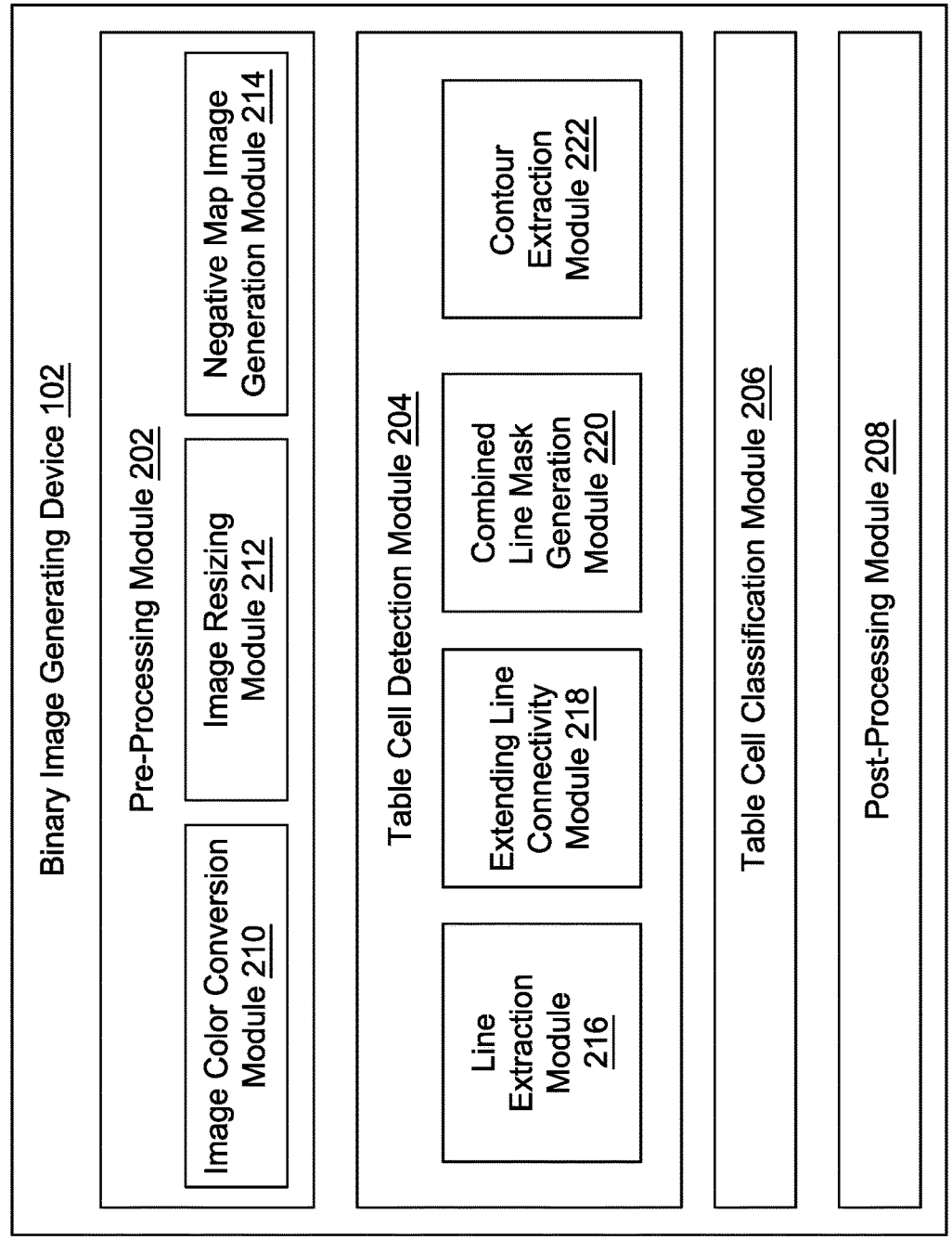
FIG. 2 is a functional block diagram of the binary image generating device, in accordance with some embodiments of the present disclosure.

Referring now to FIG. 2, a functional block diagram of the binary image generating device 102 is illustrated, in accordance with some embodiments of the present disclosure. In an embodiment, the binary image generating device 102 may include a pre-processing module 202, a table cell detection module 204, a table cell classification module 206, and a post-processing module 208 implemented by the processor 104.

Figure 3:
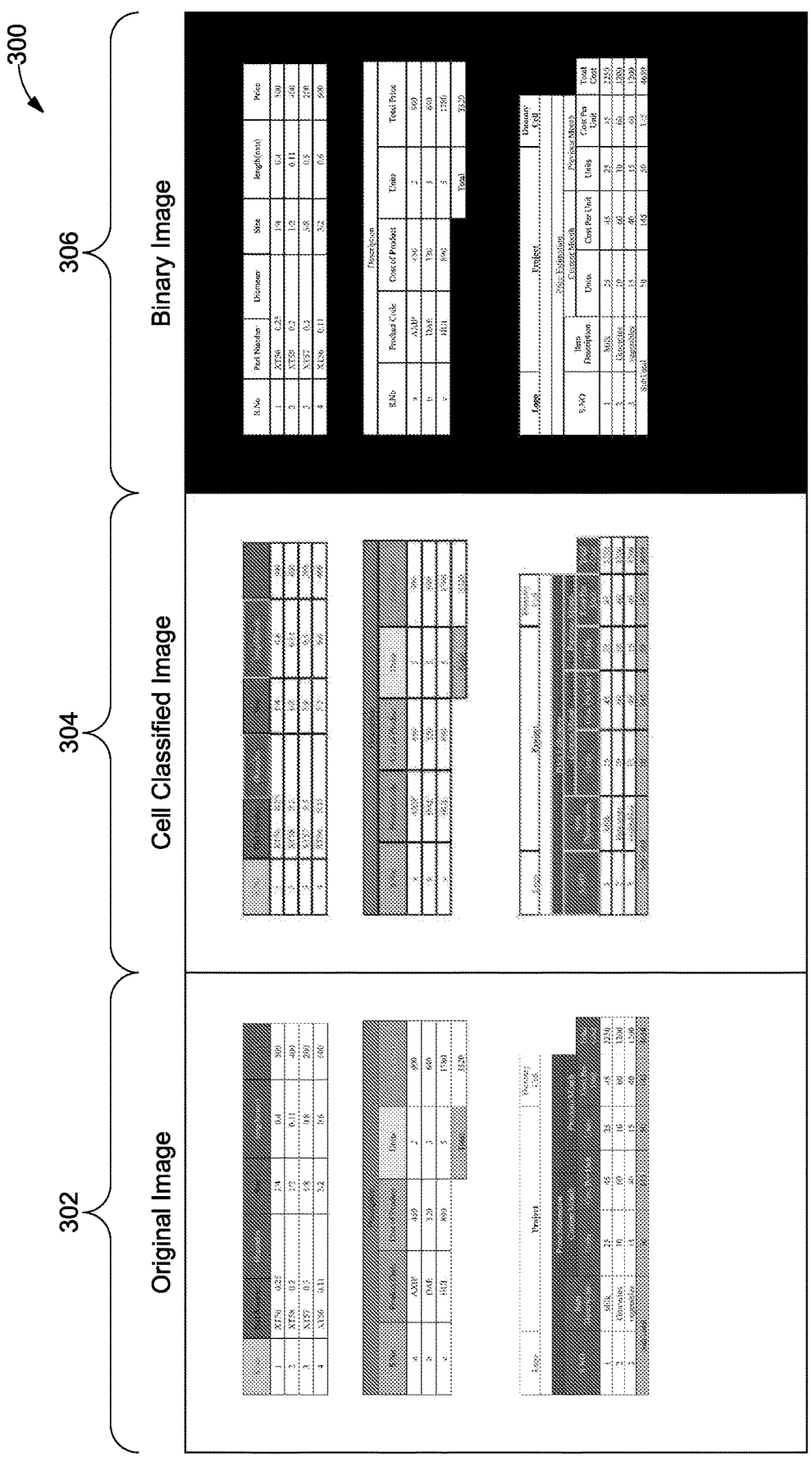
FIG. 3 depicts an exemplary input document image, a cell classified image, and a binary image, in accordance with an embodiment of the present disclosure.

In an embodiment, the pre-processing module 202 may further sub-include an image color conversion module 210, an image resizing module 212, and the negative map image generation module 214. The image resizing module 212 may resize the input document image and change the resolution of the input document image to a predefined resolution such as but not limited to, 2 megapixels, etc. The image color conversion module 210 may determine the HSV image and the grayscale image of the document image by using one or more color conversion techniques. Referring now to FIG. 3, depicts an exemplary input document image 302, a cell classified image 304, and a binary image 306, in accordance with an embodiment of the present disclosure. The exemplary document image 302 may be pre-processed by the pre-processing module 202.

Figure 4:
FIG. 4 depicts an exemplary negative map image of a table structure, in accordance with an embodiment of the present disclosure.

Further, the negative map image generation module 214 may determine the negative map image and the inverse negative map image of the resized document image. In an embodiment, the negative map image generation module 214 may convert color image to a negative map image. The negative map image may be generated by subtracting the gaussian smoothing of document image from the document image which may be a colored image and that may be converted to grayscale image. Similarly, an inverse negative map image may be generated by subtracting 255 value from the negative map image. Hence, the background region may be depicted as non-zero and, the foreground may be depicted as 0 value in the inverse negative map image. However, due to presence of similar intensity background and foreground in cells having colored text and colored background, the foreground and the background may not be differentiated while generation of the grayscale image. Referring now to FIG. 4, an exemplary negative map image 400 of a table structure in the input image 302 is depicted, in accordance with an embodiment of the present disclosure. The negative map image 400 may be a pre-processed image in which the background is depicted as black and the foreground is depicted as white. Accordingly, the negative map image 400 comprises foreground region depicted by non-zero pixel value and background depicted by pixel value equal to 0.

Accordingly, the pre-processing module may generate an HSV image, a grayscale image, a negative map image and an inverse negative map image of the input document image for further processing.

In an embodiment, the table cell detection module 204 may detect at least one table in the document image based on the detection of a region of interest (ROI) in the negative map image based on detection of a plurality of lines. Accordingly, one or more cells corresponding to the at least one table may be determined based on detection of a plurality of lines in the negative map image. The plurality of lines comprising the horizontal and the vertical lines may be extracted using morphological operations. The table cell detection module 204 may further sub-include a line extraction module 216, a extending line connectivity module 218, a combined line mask generation module 220, and a contour extraction module 222.

The line extraction module 216 may extract the plurality of lines based on morphological operations. The line extraction module 216 may extract horizontal lines and vertical lines in the negative map image using morphological operations. In an embodiment, the horizontal and vertical lines may be extracted based on morphological operations such as, but not limited to, operations based on dilation and erosion.

The extending line connectivity module 218 may extend the extracted vertical lines and the horizontal lines in order to join the boundary lines of each of the ROI containing the one or more cells. In an embodiment, the vertical and the horizontal lines may be extended based on five neighborhood connectivity of pixels.

Further, the combined line mask generation module 220 may combine or merge a horizontal line mask and a vertical line mask to determine the boundary lines of the ROI. In order to generate the horizontal and vertical line masks, first horizontal line mask may be determined by detecting horizontal lines corresponding to the ROI. Subsequently, vertical line mask may be determined by detecting vertical lines corresponding to the ROI.

Further, the contour extraction module 222 may extract the one or more cells corresponding to the table based on contour extraction using connected components labelling.

Figure 6:
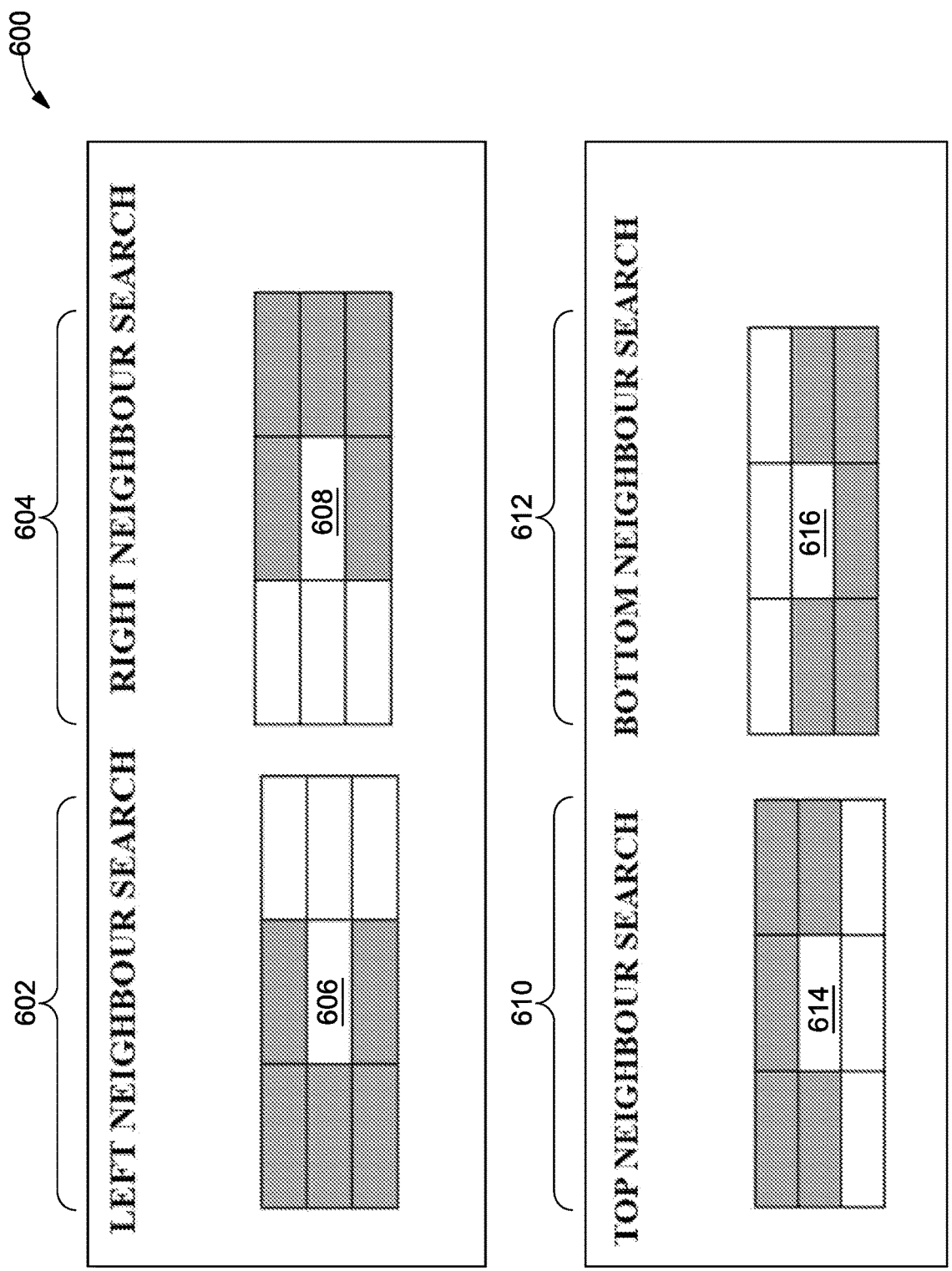
FIG. 6 depicts five neighborhood connectivity of pixels methodology, in accordance with an embodiment of the present disclosure.

Referring now to FIG. 6, five neighborhood connectivity of pixels methodology is depicted, in accordance with an embodiment of the present disclosure. The five neighborhood connectivity pixels may be used by the extending line connectivity module 218 for extending points of horizontal lines based on left five neighborhood connectivity pixels for left extreme pixel 606 as shown in image 602 by checking five surrounding pixels on the left side of pixel 606. Accordingly, for right extreme pixel 608 as shown in image 604 five surrounding pixels on the right side of pixel 608 are checked. For extending points of vertical lines, top extreme pixel 614 as shown in image 610, top extreme five neighborhood connectivity pixels are checked for extending the pixel 614 upwards vertically. Similarly, for bottom extreme pixel 616 as shown in image 612, bottom extreme five neighborhood connectivity pixels are checked for extending the pixel 616 downwards. In an embodiment, the table cell classification module 206 may compute the foreground mean value, the background mean value of each cell of the table structure based on pixel intensity values of the corresponding cell from the negative map image, the inverse negative map image and the grayscale image of the document image comprising the table. In an embodiment, the foreground mean value may be determined based on determination of a mean of intensity value of a foreground masked grayscale image for the corresponding cell comprising non-zero pixels in the negative map image. In an embodiment, the foreground masked grayscale image may be generated by masking the grayscale image to remove background pixels equal to zero in the negative map image of the corresponding cell. As shown in FIG. 3, image 304 depicts a cell classified image 304 of the input image 302 which may be determined by the table cell classification module 206.

Further, the background mean value may be determined based on determination of a mean intensity value of a background masked grayscale image for the corresponding cell comprising non-zero pixels in the inverse negative map image of the document image. In an embodiment, the background masked grayscale image may be generated by masking the grayscale image to remove background pixels equal to zero in the inverse negative map image of the corresponding cell.

In an embodiment, the foreground mean value may be determined using a function represented as follows:

fg_mean=mean(gray image [Table_Cell_Region]),
mask=negative map[Table_Cell_Region])

bg_mean=mean(gray image [Table_Cell_Region]),
mask=inverse negative map[Table_Cell_Region])

Further, the table cell classification module 206 may categorize each of the one or more cells as a dark cell or a light cell based on the foreground mean value and the background mean value of each cell. The one or more cells may be categorized as a dark cell in case the foreground mean value of the corresponding cell is greater than the background mean value of the corresponding cell. Further, the one or more cells may be categorized as a light cell in case the background mean value of the corresponding cell may be greater than the foreground mean value of the corresponding cell.

In an embodiment, the post-processing module 208 may compute a background mean HSV value of each cell of the table structure in the document image by computing a mean HSV value of the pixel color values of each of the cells in the HSV image. The background mean HSV value for each of the one or more cells may be determined based on determination of a mean HSV value of the HSV image of the corresponding cell comprising non-zero pixels in the inverse negative map image of the corresponding cell. In an embodiment, the background mean HSV value may be determined using a function represented as follows:

bg_hsv_value=mean(hsv_image[Table_Cell_Region],
mask=inverse negative map[Table_Cell_Region])

The post-processing module 208 may also compute a contrast value of each of the cells based on the foreground mean value and the background mean value of the corresponding cell. The contrast value may be computed based on determination of an absolute value of a ratio of a difference between the foreground mean value and the background mean value and a maximum of the foreground mean value and the background mean value for the corresponding cell based on following equation (1).

$$\text{contrast\_value}=\text{abs}[(\text{fg}_{mean}-\text{bg}_{mean})/\max(\text{fg}_{mean},\text{bg}_{mean})] \quad (1)$$

Further, the post-processing module 208 may determine the binary image for the corresponding cell based on the contrast value, the pre-defined threshold value, the background mean HSV value and the categorization of the corresponding cell. The binary image for the corresponding cell may be determined by performing, the inverse binary thresholding on the grayscale image with OTSU thresholding in case of the contrast value is determined to be greater than a predefined threshold value and in case the corresponding cell is categorized as a dark cell. In an embodiment, in case the corresponding cell is categorized as a light cell and the contrast value of the corresponding cell is determined to be greater than the predefined threshold value, then the binary image for the corresponding cell may be determined by performing, the binary thresholding on the grayscale image with OTSU thresholding. In an embodiment, in case the contrast value is determined to be less than the predefined threshold value for the corresponding cell, the post-processing module 208 may be determine the binary image by performing binary thresholding on the HSV image based on a lower HSV threshold and an upper HSV threshold. In an embodiment, the post-processing module 208 may determine the lower HSV threshold and the upper HSV threshold from the background mean HSV values determined for each of the cells. In an embodiment, the lower HSV threshold may be determined by subtracting a predefined number from the background mean HSV value and the upper HSV threshold may be determined by adding the predefined number from the background mean HSV value. In an embodiment, the predefined number may be selected as, but not limited to, 5.

In an embodiment, the predefined threshold value is a normalized value in a range of 0 to 1. In an embodiment, the predefined threshold may be a constant value of 0.05.

Referring now to FIG. 4, a snapshot of an exemplary solution containing original image, cell classified image, and binary image, in accordance with an embodiment of the present disclosure. The exemplary solution 400 comprises a document image 402 which on pre-processing and further performing table cell detection becomes a cell classified image 404 which on performing table cell classification and upon post-processing converts to a binary image 406 as a result.

Figure 5:
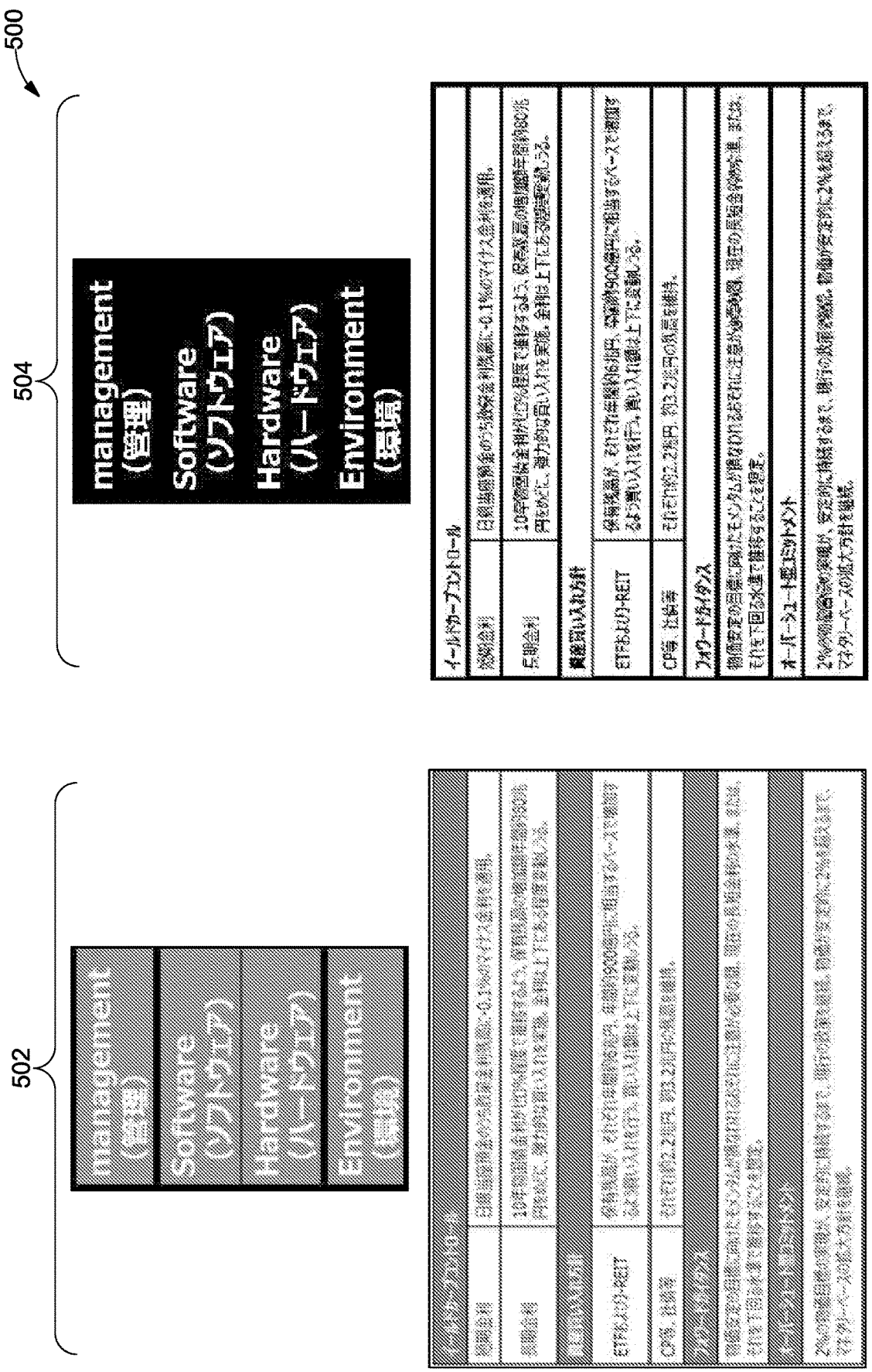
FIG. 5 depicts an exemplary input document image and a corresponding binary image output, in accordance with an embodiment of the present disclosure.

Referring now to FIG. 5, an exemplary input document image 502 and a corresponding binary image 504 output is shown, in accordance with an embodiment of the present disclosure. The image 502 is a document image containing a plurality of text in language other than English for which a binary image 504 is generated based on the methodology of the current disclosure. Accordingly, any document image including text in various language may be determined or extracted by converting the document image into a binary image as depicted in FIG. 5.

Figure 7:
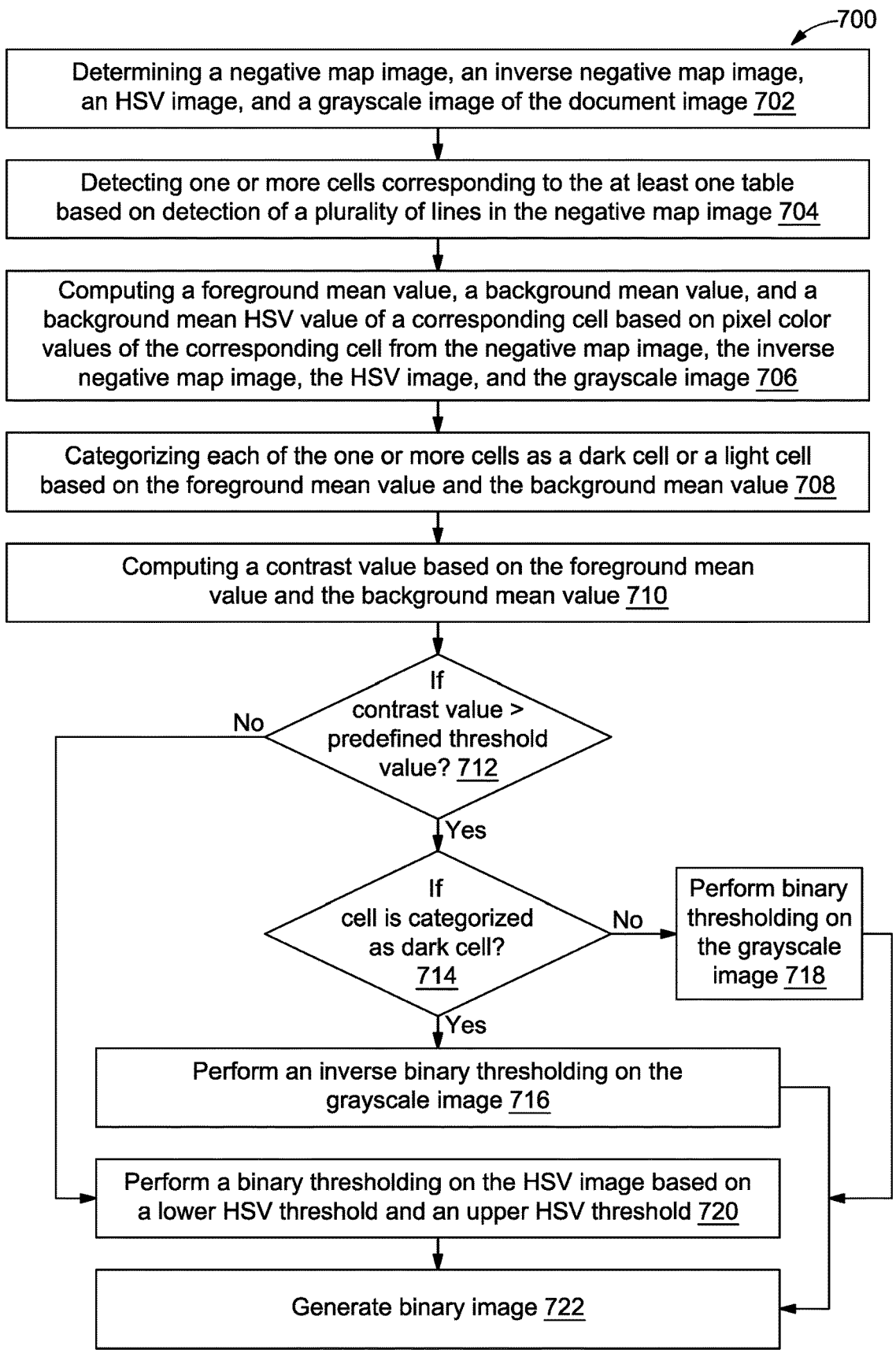
FIG. 7 is a flowchart of a method of generating a binary image from a document image, in accordance with some embodiments of the present disclosure.

Referring now to FIG. 7, a flowchart of a method of generating a binary image from a document image, in accordance with some embodiments of the present disclosure. In an embodiment, method 700 may include a plurality of steps that may be performed by the processor 104 to generate a binary image from a document image comprising at least one table structure.

At step 702, the processor 104 may determine a negative map image, an inverse negative image, an HSV image and a grayscale image of the document image. Further at step 704, the processor 104 may detect, one or more cells corresponding to the at least one table based on detection of a plurality of lines in the negative map image. The plurality of lines are determined based on morphological operations. The one or more cells corresponding to the at least one table are determined by extending boundary lines of each of the one or more cells from the plurality of lines based on five neighborhood connectivity of pixels. The one or more cells are extracted using contour extraction based on the extended lines of each of the one or more cells.

Further at step 706 the processor 104 may further compute a foreground mean value, a background mean value, and a background mean HSV value of each of the cells detected based on pixel color values or pixel intensity values of each of the cells from the negative map image, the inverse negative map image, the HSV image, and the grayscale image. In an embodiment, the foreground mean value may be determined based on determination of a mean of intensity value of a foreground masked grayscale image for the corresponding cell comprising non-zero pixels in the negative map image, the foreground masked grayscale image may be generated by masking the grayscale image to remove background pixels equal to zero in the negative map image of the corresponding cell. Accordingly, the background mean value may be determined based on determination of a mean intensity value of a background masked grayscale image for the corresponding cell comprising non-zero pixels in the inverse negative map image, the background masked grayscale image may be generated by masking the grayscale image to remove background pixels equal to zero in the inverse negative map image of the corresponding cell. The background mean HSV value for each of the one or more cells may be determined based on determination of a mean HSV value of the HSV image of the corresponding cell comprising non-zero pixels in the inverse negative map image of the corresponding cell.

Further at step 708, the processor 104 may further categorize each of the one or more cells as a dark cell or a light cell based on the foreground mean value and the background mean value of each of the one or more cells. In an embodiment, a cell from the one or more cells may be categorized as a dark cell in case the foreground mean value of the corresponding cell is determined to be greater than the background mean value of the corresponding cell. In an embodiment, a cell from the one or more cells may be categorized as a light cell in case the background mean value of the corresponding cell is determined to be greater than the foreground mean value of the corresponding cell.

Further, at step 710, the processor 104 may further compute a contrast value based on the foreground mean value and the background mean value. The contrast value may be computed based on determination of an absolute value of a ratio of a difference between the foreground mean value and the background mean value and the maximum of the foreground mean value and the background mean value for the corresponding cell.

Further, at step 712, the processor 104 may determine if the contrast value is greater than a pre-defined threshold value. The processor 104 may determine if a cell is categorized as a dark cell at step 714 in case the contrast value is determined to be greater than a predefined value at step 712.

Further, the processor may determine the binary image for the corresponding cell at step 716 in case the cell is categorized as dark cell at step 714, by performing an inverse binary with OTSU thresholding on the grayscale image. In case the cell is not categorized as a dark cell at step 714 and is categorized as a light cell, the processor 104 may determine the binary image for the corresponding cell by performing a binary with OTSU thresholding on the grayscale image. Further, in case the contrast value is determined to be less than the predefined threshold value at step 712, the processor 104, at step 720 may perform a binary thresholding on the HSV image based on a lower HSV threshold and an upper threshold. At step 722, a binary image of the document image having a table structure including one or more cells is generated based on the binary images determined for each cell of the one or more cells.

Accordingly, the present invention may effectively create binary image from a document image including cells with colored background and foreground with minimal or no difference in intensities of the foreground and the background. The extraction of foreground from the background in such colored cells may be efficiently performed by generating a binary image using the present disclosure.

It is intended that the disclosure and examples be considered as exemplary only, with a true scope of disclosed embodiments being indicated by the following claims.

What is claimed is:

1. A method of generating a binary image from a document image comprising at least one table structure, the method comprising:
   determining, by a processor, a negative map image, an inverse negative map image, an HSV image and a grayscale image of the document image;
   detecting, by the processor, one or more cells corresponding to the at least one table based on detection of a plurality of lines in the negative map image;
   for each of the one or more cells:
      computing, by the processor, a foreground mean value, a background mean value, and a background mean HSV value of a corresponding cell based on pixel color values of the corresponding cell from the negative map image, the inverse negative map image, the HSV image, and the grayscale image;
      categorizing, by the processor, each of the one or more cells as a dark cell or a light cell based on the foreground mean value and the background mean value;
      computing, by the processor, a contrast value based on the foreground mean value and the background mean value; and
      determining, by the processor, the binary image for the corresponding cell based on the contrast value, a pre-defined threshold value, the background mean HSV value and the categorization of the corresponding cell.

2. The method of claim 1, wherein the at least one table is determined based on detection of a region of interest (ROI) in the negative map image based on detection of a plurality of lines, wherein the plurality of lines are extracted based on morphological operations.

3. The method of claim 2, wherein the one or more cells corresponding to the at least one table are determined by extending boundary lines of each of the one or more cells based on the extracted plurality of lines based on five neighbourhood connectivity of pixels, and wherein the one or more cells are extracted using contour extraction based on the extended boundary lines of each of the one or more cells.

4. The method of claim 1, wherein the foreground mean value is determined based on determination of a mean of intensity value of a foreground masked grayscale image for the corresponding cell comprising non-zero pixels in the negative map image, wherein the foreground masked grayscale image is generated by masking the grayscale image to remove background pixels equal to zero in the negative map image of the corresponding cell.

5. The method of claim 1, wherein the background mean value is determined based on determination of a mean intensity value of a background masked grayscale image for the corresponding cell comprising non-zero pixels in the inverse negative map image, wherein the background masked grayscale image is generated by masking the grayscale image to remove background pixels equal to zero in the inverse negative map image of the corresponding cell.

6. The method of claim 1, wherein the background mean HSV value for each of the one or more cells is determined based on determination of a mean HSV value of the HSV image of the corresponding cell comprising non-zero pixels in the inverse negative map image of the corresponding cell.

7. The method of claim 1, wherein the one or more cells are categorized as a dark cell in case the foreground mean value of the corresponding cell is greater than the background mean value of the corresponding cell.

8. The method of claim 1, wherein the one or more cells are categorized as a light cell in case the background mean value of the corresponding cell is greater than the foreground mean value of the corresponding cell.

9. The method of claim 1, wherein the contrast value is computed based on determination of an absolute value of a ratio of a difference between the foreground mean value and the background mean value and a maximum of the foreground mean value and the background mean value for the corresponding cell.

10. The method of claim 1, wherein the binary image for the corresponding cell is determined by:
performing, by the processor, an inverse binary thresholding on the grayscale image in case the contrast value is greater than a predefined threshold value and in case the corresponding cell is categorized as a dark cell, or
performing, by the processor, a binary thresholding on the grayscale image in case the contrast value is greater than the predefined threshold value and in case the corresponding cell is categorized as a light cell, or
performing, by the processor, a binary thresholding on the HSV image based on a lower HSV threshold and an upper HSV threshold in case the contrast value is less than the predefined threshold value.

11. A system of generating a binary image from a document image comprising at least one table structure, the system comprising:
a processor; and
a memory communicably coupled to the processor, wherein the memory stores processor-executable instructions, which, on execution by the processor, cause the processor to:
determine a negative map image, an inverse negative map image, an HSV image and a grayscale image of the document image;
detect one or more cells corresponding to the at least one table based on detection of a plurality of lines in the negative map image;
for each of the one or more cells,
compute a foreground mean value, a background mean value, and a background mean HSV value of a corresponding cell based on pixel color values of the corresponding cell from the negative map image, the inverse negative map image, the HSV image, and the grayscale image;
categorize each of the one or more cells as a dark cell or a light cell based on the foreground mean value and the background mean value;
compute a contrast value based on the foreground mean value and the background mean value; and
determine the binary image for the corresponding cell based on the contrast value, a pre-defined threshold value, the background mean HSV value and the categorization of the corresponding cell.

12. The system of claim 11, wherein the at least one table is determined based on detection of a region of interest (ROI) in the negative map image based on detection of a plurality of lines, wherein the plurality of lines are extracted based on morphological operations.

13. The system of claim 12, wherein the one or more cells corresponding to the at least one table are determined by extending boundary lines of each of the one or more cells based on the extracted plurality of lines based on five neighbourhood connectivity of pixels, and
wherein the one or more cells are extracted using contour extraction based on the extended boundary lines of each of the one or more cells.

14. The system of claim 11, wherein the foreground mean value is determined based on determination of a mean of intensity value of a foreground masked grayscale image for the corresponding cell comprising non-zero pixels in the negative map image, wherein the foreground masked grayscale image is generated by masking the grayscale image to remove background pixels equal to zero in the negative map image of the corresponding cell.

15. The system of claim 11, wherein the background mean value is determined based on determination of a mean intensity value of a background masked grayscale image for the corresponding cell comprising non-zero pixels in the inverse negative map image, wherein the background masked grayscale image is generated by masking the grayscale image to remove background pixels equal to zero in the inverse negative map image of the corresponding cell.

16. The system of claim 11, wherein the background mean HSV value for each of the one or more cells is determined based on determination of a mean HSV value of the HSV image of the corresponding cell comprising non-zero pixels in the inverse negative map image of the corresponding cell.

17. The system of claim 11, wherein the one or more cells are categorized as a dark cell in case the foreground mean value of the corresponding cell is greater than the background mean value of the corresponding cell.

18. The system of claim 11, wherein the one or more cells are categorized as a light cell in case the background mean value of the corresponding cell is greater than the foreground mean value of the corresponding cell.

19. The system of claim 11, wherein the contrast value is computed based on determination of an absolute value of a ratio of a difference between the foreground mean value and the background mean value and a maximum of the foreground mean value and the background mean value for the corresponding cell.

20. The system of claim 11, wherein to determine the binary image for the corresponding cell, the processor-executable instructions cause the processor to:
- perform an inverse binary thresholding on the grayscale image in case the contrast value is greater than a predefined threshold value and in case the corresponding cell is categorized as a dark cell, or
- perform a binary thresholding on the grayscale image in case the contrast value is greater than the predefined threshold value and in case the corresponding cell is categorized as a light cell, or
- perform a binary thresholding on the HSV image based on a lower HSV threshold and an upper HSV threshold in case the contrast value is less than the predefined threshold value.

* * * * *